United States Patent [19]

Koch et al.

[11] 4,418,518

[45] Dec. 6, 1983

[54] MECHANISM FOR SPRING LOADING A TRANSPORT LOCK

[75] Inventors: Earl E. Koch, Mohnton; A. Dale Gamber, Lancaster; Philip J. Ehrhart, Narvon, all of Pa.

[73] Assignee: Sperry Corporation, New Holland, Pa.

[21] Appl. No.: 374,356

[22] Filed: May 3, 1982

[51] Int. Cl.³ .................................................. A01B 73/00
[52] U.S. Cl. ...................................... 56/228; 56/15.5; 172/679; 280/462
[58] Field of Search .............. 56/15.8, 228; 172/245, 172/625, 679; 280/462, 463, 467, 468

[56] References Cited

U.S. PATENT DOCUMENTS

| | | | |
|---|---|---|---|
| 3,751,071 | 8/1973 | Patterson et al. | 172/679 |
| 3,832,837 | 9/1974 | Burkhart et al. | 56/228 |
| 3,919,831 | 11/1975 | Halls et al. | 56/228 |
| 3,993,206 | 11/1976 | Jomen et al. | 280/468 |
| 4,037,395 | 7/1977 | Henkensiefken | 56/228 |
| 4,081,946 | 4/1978 | Ehrhart | 56/15.8 |

*Primary Examiner*—Paul J. Hirsch

*Attorney, Agent, or Firm*—Larry W. Miller; Frank A. Seemar; Darrell F. Marquette

[57] ABSTRACT

A mechanism for spring loading a transport lock on a crop harvesting machine having a pivotally movable tongue mounted to the frame of the harvesting machine, commonly referred to as a pivot-tongue windrower, is disclosed wherein first and second springs are compressible to exert a biasing force on a locking pin to urge the pin through suitable aligned apertures in the base of the tongue and in the frame of the machine to automatically extend the locking pin through the apertures when they become aligned due to manipulation of the pivotal movement of the tongue by the operator at a location remote from the locking pin. An actuating lever includes a camming surface that is selectively cooperable with either the bight portion of the housing or the base plate on the tongue to effect a compression of the first and second springs, respectively, to bias the locking pin toward either a locked or unlocked position. The lever maintains the respective spring in compression until the locking pin moves into the position in which it is being urged.

9 Claims, 7 Drawing Figures

MECHANISM FOR SPRING LOADING A TRANSPORT LOCK

BACKGROUND OF THE INVENTION

The present invention relates generally to crop harvesting machines, commonly referred to as pivot-tongue windrowers, and, more particularly, to a mechanism to spring load a transport lock for automatically moving a locking pin between locked and unlocked positions.

Pivot-tongue harvesting machines, such as the windrower depicted in U.S. Pat. No. 3,832,837, have been developed to enable the operator to swing the harvester from a transport position rearwardly of the tractor to an outwardly operating position by manipulation of the position of the tongue relative to the frame of the machine. Pivot-tongue windrowers having the pivotable tongue mounted near the center of the harvester, such as seen in U.S. Pat. No. 4,081,946, can be used to harvest crop to either side of the tractor, as well as be transported in a position directly rearwardly of the tractor. Locking devices have been used to lock the harvester in its transport position when being transported from one job location to another.

One such locking device is a pin inserted through appropriately aligned holes in the movable tongue and the stationary frame. This locking pin would then prevent the tongue from moving relative to the frame and, therefore, lock the machine in its transport position. As can be seen in the aforementioned U.S. Pat. No. 4,081,946, the position of the tongue or draw bar relative to the frame is controlled through manipulation of a hydraulic cylinder operatively interconnecting the tongue and the frame; however, because of the desire to control the operating position of the harvester during operation thereof, the controls for the manipulation of the hydraulic cylinder are generally located on the tractor.

Since the two holes corresponding to the tongue and the frame, respectively, must be aligned before the locking pin can be inserted, the procedure for locking the harvester in its transport position can be both frustrating and time-consuming if undertaken by only one person due to the numerous trips between the tractor and the rear of the harvester that may be necessary to assure proper alignment of the holes. Conversely, the withdrawal of the locking pin also requires proper alignment of the corresponding holes, as a slight misalignment may bind the locking pin and make withdrawal thereof difficult.

Having observed the transport lock actuator that is the subject matter of copending U.S. patent application Ser. No. 364,951 filed Apr. 2, 1982 in the names of James T. Donovan and E. Graham Webster and having the same Assignee as the present invention, it was felt that a more reliable, better functioning and less expensive actuating mechanism for a transport lock on a pivot-tongue windrower could be developed.

SUMMARY OF THE INVENTION

It is an object of this invention to overcome the aforementioned disadvantages of the prior art by providing a mechanism for spring loading a transport lock to be operable to automatically insert or withdraw a locking pin through a pair of alignable holes when they become aligned.

It is another object of this invention to provide a transport lock actuator that is operable to both lock and unlock the transport position of a harvester.

It is an advantage of this invention that an operator can actuate the transport lock of a pivot-tongue harvester from his tractor by manipulation of the hydraulic cylinder to pivot the tongue relative to the frame of the machine without making repeated trips to the harvester to determine if the holes are aligned.

It is a feature of this invention that the transport lock actuating mechanism is simple and economical in design and construction.

It is another object of this invention to provide a mechanism for spring loading a transport lock on a harvester incorporating a pivotable tongue, which has a pair of springs and an actuating lever therebetween for selectively compressing the springs to impose a biasing force on a locking pin to urge it toward either a locked or an unlocked position.

It is still another object of this invention to provide a transport lock actuator that is operable merely by moving a lever without repositioning it relative to the springs.

It is yet another object of this invention to provide mechanism for automatically actuating a transport lock on a harvesting machine, that it can be readily disassembled for ease of service and repair.

It is a further object of this invention to provide a transport lock actuator that utilizes two springs, one to urge the locking pin toward the locked position, the other to urge the locking pin toward the unlocked position.

It is still a further object of this invention to provide an actuator lever for an automatic transport lock actuator that includes a camming surface selectively cooperable with the housing and the tongue base plate to compress the respective spring.

It is a feature of this invention that the actuating lever of the transport lock actuator will maintain the respective spring in a compressed state until the locking pin moves into the position in which it has been biased.

It is yet a further object of this invention to provide a transport locking pin actuator which is durable in construction, inexpensive of manufacture, carefree of maintenance, facile in assemblage, and simple and effective in use.

These and other objects, features and advantages are accomplished according to the instant invention by providing a mechanism for spring loading a transport lock on a crop harvesting machine having a pivotally movable tongue mounted to the frame of the harvesting machine, commonly referred to as a pivot-tongue windrower, is disclosed wherein first and second springs are compressible to exert a biasing force on a locking pin to urge the pin through suitable aligned apertures in the base of the tongue and in the frame of the machine to automatically extend the locking pin through the apertures when they become aligned due to manipulation of the pivotal movement of the tongue by the operator at a location remote from the locking pin. An actuating lever includes a camming surface that is selectively cooperable with either the bight portion of the housing or the base plate on the tongue to effect a compression of the first and second springs, respectively, to bias the locking pin toward either a locked or unlocked position. The lever maintains the respective spring in compression until the locking pin moves into the position in which it is being urged.

BRIEF DESCRIPTION OF THE DRAWINGS

The advantages of this invention will become apparent upon consideration of the following detailed disclosure of the invention, especially when taken in conjunction with the accompanying drawings wherein.

DETAILED DESCRIPTION OF THE PREFERRED EMBODIMENT

Figure 1:
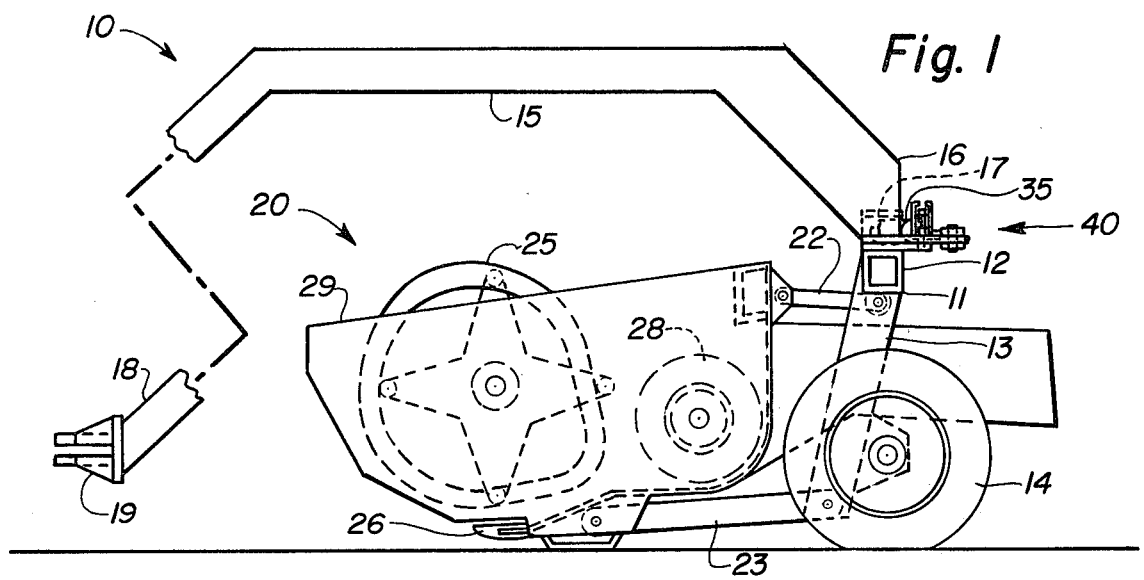
FIG. 1 is a side-elevational view of a crop harvesting machine, commonly referred to as a pivot-tongue windrower, incorporating the principles of the instant invention.
Figure 2:
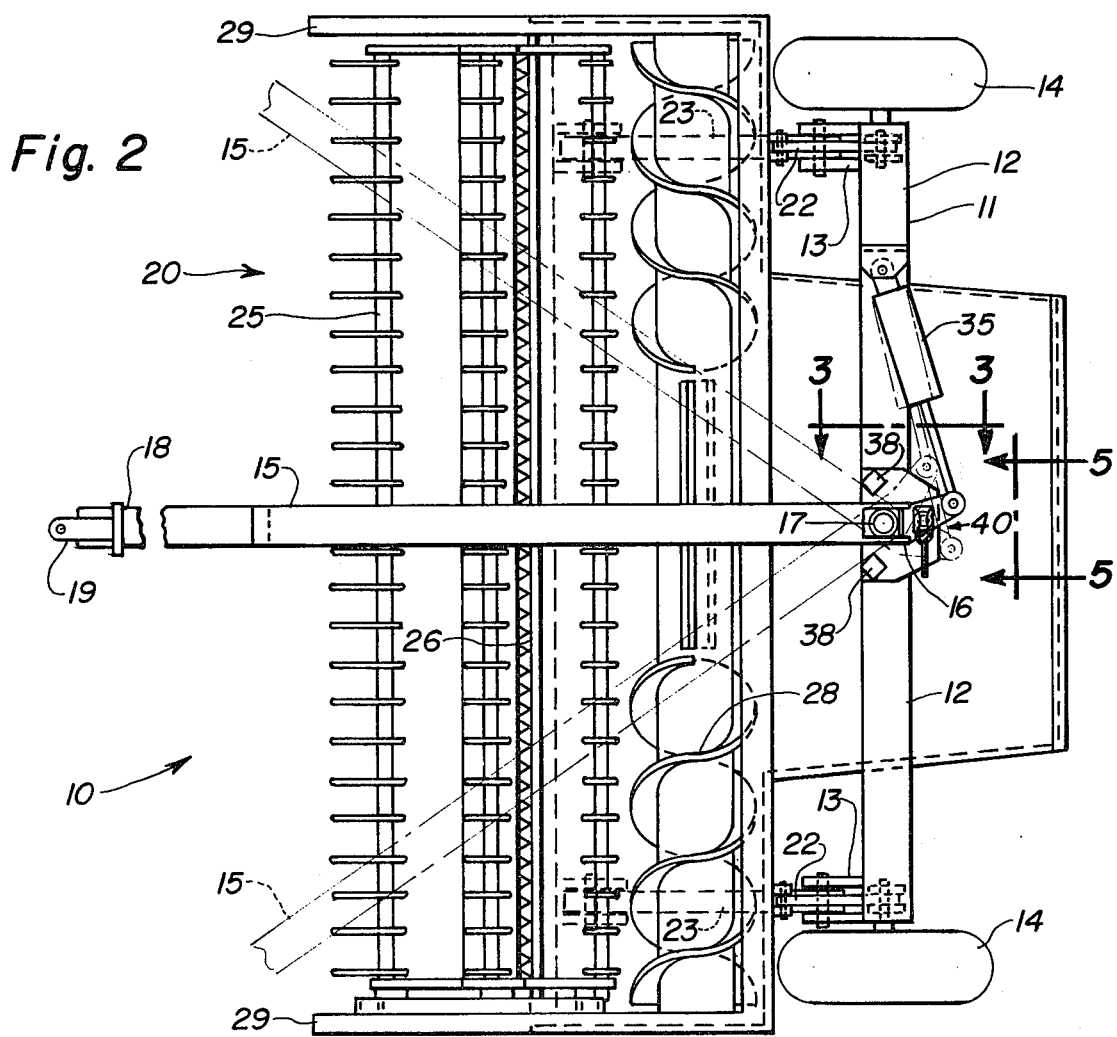
FIG. 2 is a top-plan view of the crop harvesting machine seen in FIG. 1, the extreme operating positions of the pivotally mounted tongue being shown in phamtom.

Referring now to the drawings and, particularly, to FIGS. 1 and 2, a side-elevational view and a top-plan view of a crop harvesting machine, commonly referred to as a pivot-tongue windrower, can be seen. Any left or right references are used as a matter of convenience, and are determined by standing at the rear of the machine facing the forward end, the direction of travel.

The pivot-tongue windrower 10 is of the type described in U.S. Pat. No. 4,081,946, issued to Philip J. Ehrhard on Apr. 4, 1978. The windrower 10 includes a generally U-shaped frame 11 having a transverse beam member 12 and downwardly depending leg members 13 onto which wheels 14 are mounted. An arched tongue 15 is pivotally connected at its rearward end 16 to the frame 11 by a generally vertically aligned pivot axis 17, such that the tongue 15 is pivotally movable in a transverse direction from left to right. The arched tongue 15 projects forwardly from the frame 11 over top of the header 20 and terminates at its forward end 18 in a clevis 19 which is adapted for connection to a source of motive power, such as a tractor.

The header 20 is pivotally connected to the frame 11 by a pair of lower links 22 and at least one upper link 23 so that the header 20 is free to move in a generally vertical direction relative to the frame 11 through the use of a header lift mechanism, not shown. The header 20 includes a reel 25 rotatably mounted between a pair of opposing side sheets 29. A cutterbar 26 mounted between the side sheets 29 below the reel 25 is operable to sever standing crop material. Harvesting machines such as the windrower 10 typically have a conditioning mechanism, not shown, mounted between the depending leg members 13 of the frame 11. If the width of the conditioning mechamnism is less than the width of the header, as defined by the distance between the opposing side sheets 29, a crop consolidating mechanism such as the auger 28 is generally provided to consolidate the severed crop and discharge it to the conditioning mechanism. The operation of the header 20 in harvesting standing crop is well known in the art and will not be discussed further.

Figure 3:
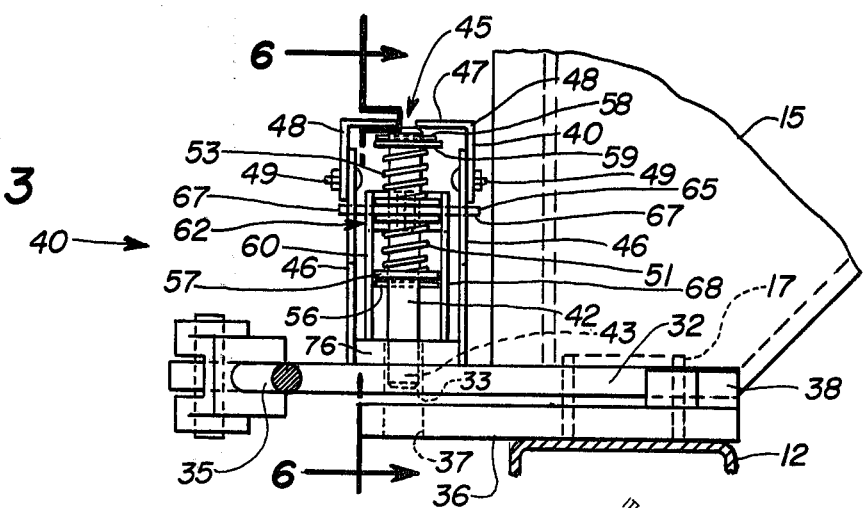
FIG. 3 is an enlarged side-elevational view of the actuating mechanism corresponding to lines 3—3 of FIG. 2.
Figure 4:
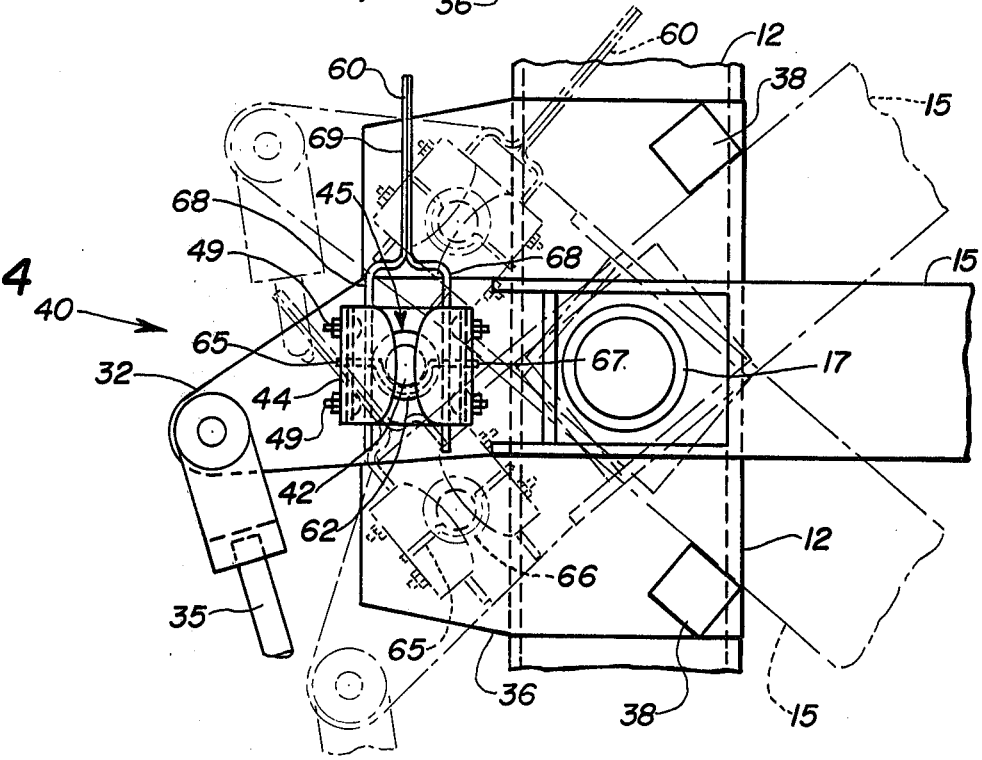
FIG. 4 is a top-plan view of the actuating mechanism seen in FIG. 3, the pivotal movement of the tongue relative to the frame being shown in phantom.
Figure 5:
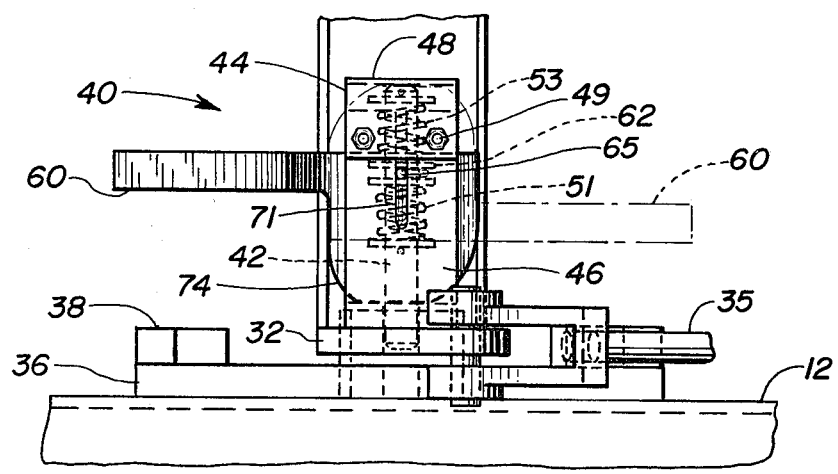
FIG. 5 is a rear-elevational view of the actuating mechanism seen in FIG. 2 and corresponding to lines 5—5, the position of the actuating lever for biasing the locking pin in its locked position being shown in phantom.

Referring now to FIGS. 3, 4 and 5, an enlarged view of the rearward end 16 of the arched tongue 15 can be seen. A base plate 32 is affixed to the rearward end 16 of the tongue 15 to be pivotable therewith relative to the frame 11 about the vertical pivot 17. A hydraulic cylinder 35 interconnecting the base plate 32 and the upper transverse beam 12 of the frame 11, as best seen in FIG. 2, provides a source of power for pivotally moving the arched tongue 15 about the pivot 17. A frame plate 36, corresponding to the base plate 32, is affixed to the upper transverse beam 12 such that the base plate 32 is movable relative thereto and immediately thereabove. The frame plate 36 includes stops 32 to limit the amount of pivotal movement of the arched tongue 15 in both the left and right directions. The center position, seen in FIG. 4 in solid lines, is the transport position for a windrower 10 having its arched tongue 15 mounted near the center of the transverse beam 12. When the arched tongue 15 is in this transport position, a hole 33 in the base plate 32 is aligned with a corresponding hole 37 in the frame plate 36 to provide the capability of locking the pivotable tongue 15 in the transport position.

A transport lock actuating mechanism 40, using a locking pin 42 insertable through the holes 33 and 37 when aligned, is provided to lock the arched tongue 15 in its transport position. A U-shaped housng 44 is affixed to the base plate 32 to be movable therewith relative to the frame 11. The housing 44 includes a pair of spaced-apart leg members 46 affixed to the base member 32 on opposing sides of the locking pin 42 and extending upwardly therefrom in a generally vertical direction. A pair of generally L-shaped members 48 are affixed to the leg members 46 by a pair of bolts 49. The L-shaped members 48 are directed toward each other, but terminate in a spaced-apart relationship to form a bight portion 47 of the housing 44 having a gap 45 therein for purposes described in detail below.

The locking pin 42 is coaxially aligned with the hole 33 in the base plate 32 and projects upwardly therefrom to be engageable with the bight portion 47 of the housing 44. A first spring 51 and a second spring 53 are concentrically mounted on the locking pin 42 for sliding movement along the length thereof. The movement of the springs 51, 53 is limited by a lower pin stop 56 and an upper pin stop 58, both of which consist of a pin inserted through the locking pin 42. A washer 57 is concentrically mounted on the locking pin 42 between the first spring 51 and the lower pin stop 56 to cooperate with the lower pin stop 56 and serve as a spring retention mechanism for limiting the downward movement of the spring 51. Similarly, a second washer 59 is concentrically mounted on the locking pin 42 between the second spring 53 and the upper pin stop 58 to serve as a spring retention mechanism for limiting the movement of the second spring 53 upwardly along the locking pin 42.

An actuating lever 60 is pivotally connected to a spring engagement member 62 slideably mounted on the locking pin 42 between the first and second springs 51, 53. The spring engagement member 62 consists of a pair of spaced-apart washers 63 concentrically mounted on the locking pin 42 and affixed to a pivot pin 65 positioned therebetween. As is best seen in FIG. 4, the pivot pin 65 includes a curved portion 66, circumscribing the locking pin 42, and opposing outwardly projecting linear tabs 67.

The actuating lever 60 is constructed of a pair of spaced-apart members 68 pivotally connected to the pivot pin 65 on opposing sides of the locking pin 42, yet inside the leg members 46 of the housing 44. The spaced-apart members 68 converge into a handle 69 at a distance spaced from the pivotal connection on the pivot pin 65 sufficiently to permit the handle 69 to pass above the locking pin 42 when the lever 60 is pivotally moved, as will be described in further detail below. The members 68 also include a camming surface 74 spaced from the pivot 65 and engagable with either the bight portion 47 of the housing 44 or the base plate 32 to effect a compression of the first spring 51 or the second spring 53, respectively, as will also be described in further detail below.

The tabs 67 of the pivot pin 65 project outwardly beyond the pivotal connection with the spaced-apart members 68 of the actuating lever 60 to extend through a slot-shaped hole 71 in the leg members 46 of the housing 44 in axial alignment with the locking pin 42. The engagement of the tabs 67 within the slot-shaped holes 71 serves to guide the spring engagement members 62 along the length of the locking pin 42, as well as help retain the locking pin 42 and the attached actuating lever 60 in a proper orientation with respect to the hole 33 in the base plate 32.

Referring now to FIGS. 3-7, the operation of the actuating mechanism 40 to spring load the locking pin toward either a locked or an unlocked position, can be seen. The locking pin 42 is in a locked or transport position when the locking pin is inserted through both holes 33 and 37 in the base plate 32 and the frame plate 36, respectively, thereby preventing any relative movement between the tongue 15 and the frame 11. The locking pin 42 is in an unlocked or operating position when the locking pin 42 is retracted from the hole 37 in the frame plate 36 to permit relative movement between the base plate 32 and the frame plate 36, thereby allowing the tongue 15 to pivotally move relative to the frame 11.

The solid lines in FIG. 3 indicate the unlocked or operating positions of the locking pin 42. The actuating lever 60 is positioned with the camming surface 74 engaged with the base plate 32. It should be noted that it may be necessary to insert one or more spacer blocks 76 between the lever 60 and the base plate 32 to insure proper engagement with the camming surface 74 of the lever 60, depending upon the spacial relationships between the various components of the actuating mechanism 40. The position seen in FIG. 3 corresponds to the normal operating position during the harvesting operation of the windrower 10, wherein the tongue 15 is free to pivotally move relative to the frame 11. It can be seen in FIGS. 3 and 5 that the locking pin is in its unlocked position and both springs 51, 53 are in a generally relaxed state.

Figure 6:
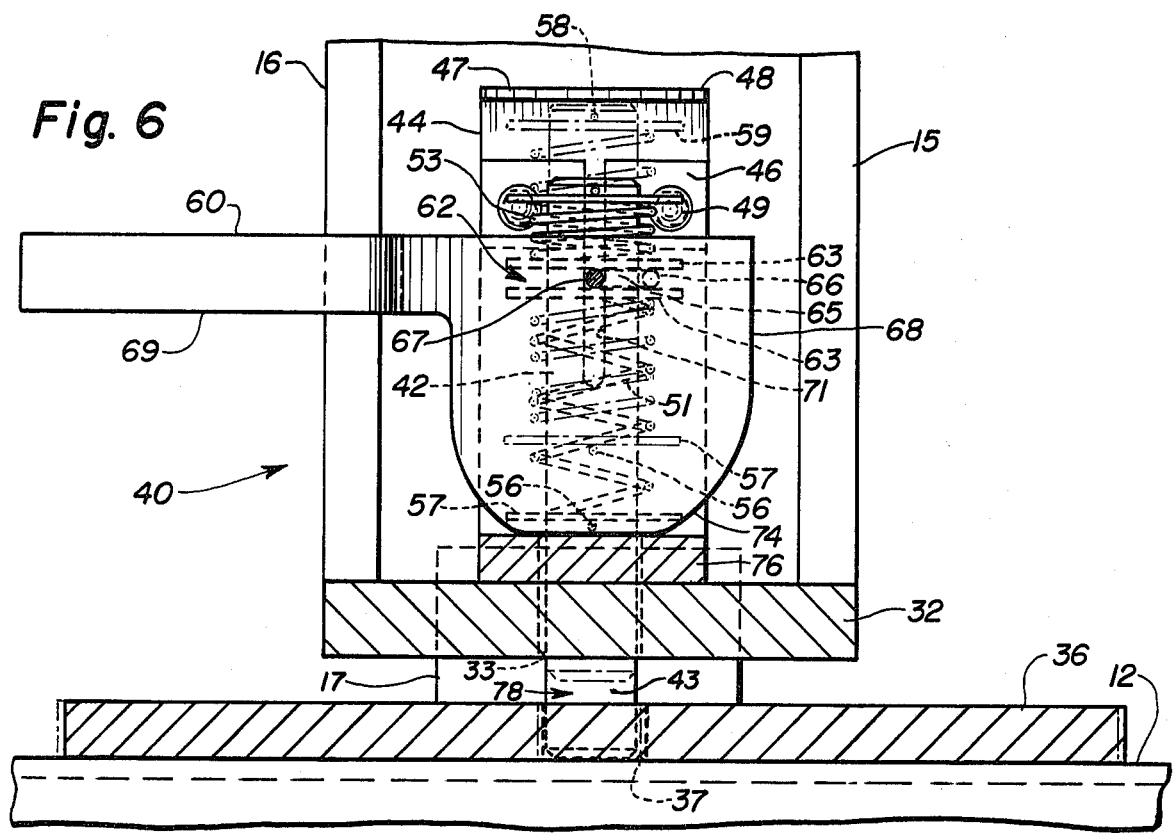
FIG. 6 is an enlarged cross-sectional view of the actuating mechanism taken along lines 6—6 of FIG. 3, the solid lines showing the position of the actuating mechanism to bias the locking pin toward the unlocked position, shown in phantom.
Figure 7:
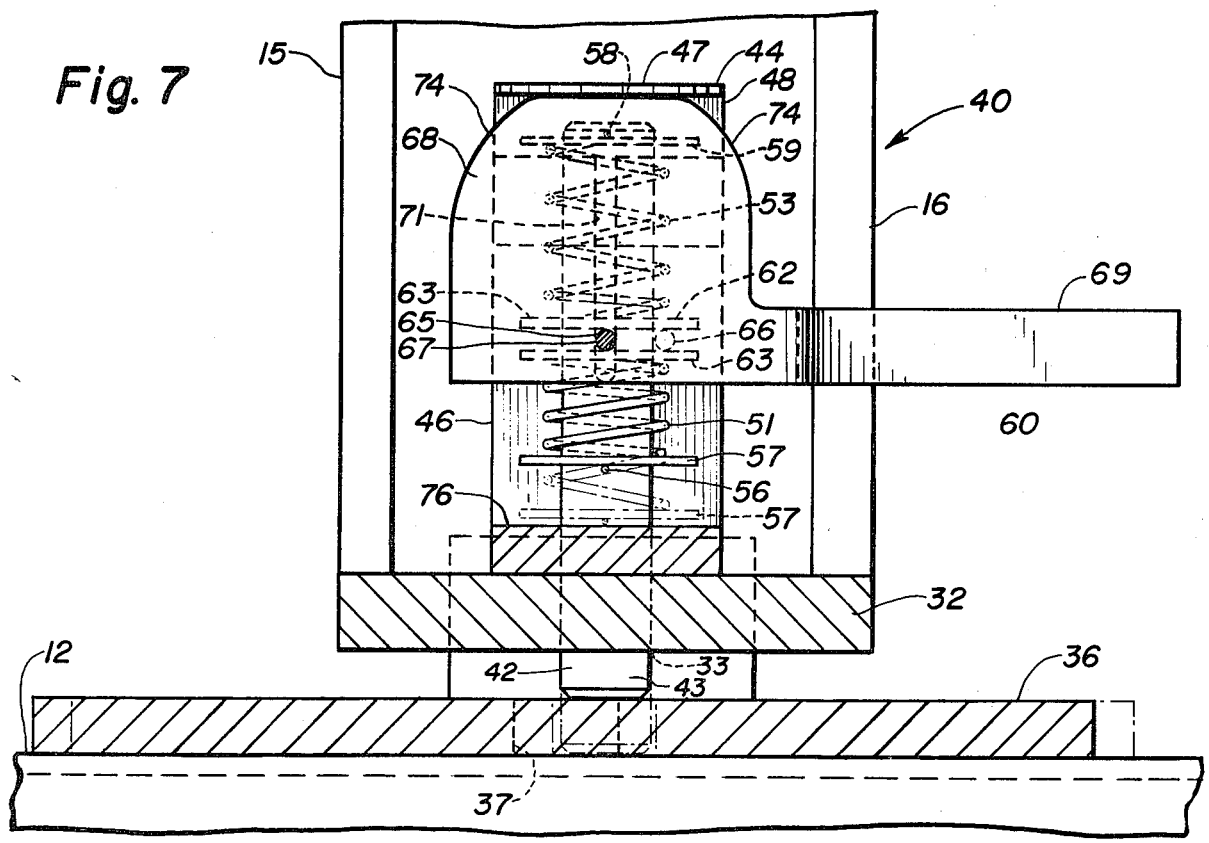
FIG. 7 is an enlarged cross-sectional view of the actuating mechanism taken along lines 6—6 of FIG. 3, the solid lines indicating the unlocked position of the actuating mechanism with the locking pin being biased toward the locked position, shown in phantom.

To spring load the locking pin 42 toward its locked position and, thereby, permit an automatic movement of the locking pin 42 into its locked position when the holes 33 and 37 become aligned, the operator must simply flip the lever 60 from the position seen in FIG. 6 to the position seen in FIG. 7, during which movement the handle 69 of the lever 60 passes through the gap 45 in the bight portion of the housing 44. The movement of the lever 60 to the position seen in FIG. 7 causes the camming surface 74 of the spaced-apart members 68 of the lever 60 to engage the respective L-shaped members 48 forming the bight portion 47 of the housing 44. This camming action moves the spring engaging member 62 downwardly along the locking pin 42 to compress the first spring 51 against the lower spring retention stop 56.

It should be noted by one skilled in the art that when the locking pin 42 is in its unlocked position, the lower end 43 of the locking pin 42 is spaced slightly above the frame plate 36 and is held in this position by the force of the second spring 53 exerted between the spring engagement member 62 and the upper spring retention stop 58. Since the spring engagement member 62 is held in position by the lever 60, the movement of the lever from the position seen in FIG. 6 to the position seen in FIG. 7 frees the spring engagement member 62 for movement along the length of the locking pin 42. As a result, the locking pin 42 drops slightly until the lower end 43 of the locking pin 42 rests on the frame plate 37, thereby creating a space 78 between the top of the locking pin 42 and the bight portion 47 of the housing 44 to permit the passage of the lever 60 therebetween.

As noted above, the camming action of the actuating lever 60 against the bight portion 47 of the housing 44 forces the spring engagement member 62 downwardly along the locking pin 42 and compresses the first spring 51 against the lower pin stop 56. The locking pin 42 remains in the position seen in FIG. 7 with the lower end 43 of the locking pin 42 being against the frame plate 36. Manipulation of the hydraulic cylinder 35 aligns the holes 33, 37, permitting the locking pin 42 to move to the locked position. Since the movement of the locking pin 42 is no longer restrained by the frame plate 36, the compressed first spring 51 will move the locking pin 42 into the locked position, with the lower pin stop 56 resting against the spacer block 76, as seen in phantom in FIG. 7.

As noted above, when the locking pin 42 is in the locked position, the tongue 15 cannot move relative to the frame 11 and the machine 10 is locked in a transport position. When the operator has reached a location at which he wishes to operate the machine 10, the operator merely flips the lever 60 from the position seen in FIG. 7 to the position seen in FIG. 6. The movement of the lever 60 to the position seen in FIG. 6 causes the camming surface 74 on the spaced-apart member 68 to engage the spacer block 76 affixed to the base plate 32. This camming action forces the spring engagement member 62 upwardly along the locking pin 42, as guided by the tab 67 moving within the slot-shaped hole 71 in the legs 46 of the housing 44.

The movement of the spring engagement member 62 compresses the second spring 53 upwardly against the upper spring retention stop 58, thereby spring loading the locking pin 42 toward the unlocked position. One skilled in the art should readily realize that if the holes 33 and 37 are properly aligned, the locking pin 42 will readily move to its unlocked position. On the other hand, if the holes 33, 37 are slightly misaligned, thereby binding the locking pin 42, the locking pin 42 will not be free to move, thereby permitting the spring 53 to compress against the upper pin stop 58.

Manipulation of the hydraulic cylinder 35 to effect a movement of the base plate 32 will more perfectly align the holes 33, 37, permitting the biasing force exerted by the compressed second spring 53 to move the locking pin 42 into its unlocked position, as seen in phantom in FIG. 6.

It will be understood that various changes in the details materials, steps and arrangement of parts which have been described and illustrated to explain the nature of the invention, will occur to and may be made by those skilled in the art upon a reading of the disclosure within the principles and scope of the invention. The foregoing description illustrates the preferred embodiments of the invention; however, concepts, as based upon such a description, may be employed in other embodiments without departing from the scope of the invention. Accordingly, the following claims are intended to protect the invention broadly as well as in the specific form shown herein.

Having thus described the invention, what is claimed is:

1. A transport lock actuating mechanism for a crop harvesting machine having a mobile frame, said frame having a first aperture therethrough, harvesting apparatus operatively supported on said frame for the harvesting of crop material, a tongue having a first end pivotally connected to said frame and a remote second end adapted for connection to a primary mover, a base member affixed to the first end of said tongue to be pivotally movable therewith and having a second aperture therethrough alignable with said first aperture, and power means interconnecting said tongue and said frame for pivoting said tongue relative to said frame, comprising:
    (a) a housing mounted on said base member and movable therewith, said housing including two spaced-apart leg members affixed to said base member on opposing sides of said second aperture and a bight portion spaced from said base member and connected to said leg members;
    (b) a locking pin positioned between said leg members for insertion through said second aperture and said first aperture when aligned with said second aperture, said locking pin being in a locked position when inserted through both said first and second apertures, thereby preventing relative movement between said base member and said frame, and in an unlocked position when said locking pin does not extend into said first aperture such that said base member is free to move relative to said frame;
    (c) first and second springs concentrically mounted on said locking pin, said first and second springs being compressible to bias said locking pin toward said unlocked and said locked positions, respectively;
    (d) first and second spring retention members fixed to said locking pin to limit the movement of said first and second springs relative to said locking pin;
    (e) a spring engaging member concentrically mounted on said locking pin between said first and second springs for sliding movement relative to said locking pin to selectively engage said first spring and said second spring for compression thereof against said first retention member and said second retention member, respectively; and
    (f) an actuating lever pivotally connected to said spring engaging member and operble to selectively move said spring engaging member toward said first retention member and said second retention member to compress said first and second springs, respectively, said actuating lever being further operable to retain said first and second springs in said compressed state until said locking pin moves into the respective position in which it has been biased.

2. The actuating mechanism of claim 1 wherein said actuating lever includes a camming surface cooperable with said bight portion of said housing and said base member to move said spring engaging member toward said first and second retention members, respectively, to compress said first and second springs, respectively.

3. The actuating mechanism of claim 2 wherein each said leg member of said housing includes a slot-shaped hole therein aligned substantially parallel to the orientation of said locking pin, said actuating lever including tabs slideably received within said slot-shaped holes to help guide the movement of said spring engaging member and retain the position of said actuating lever and said locking pin within said housing.

4. The actuating mechanism of claim 3 wherein said tabs are coaxially aligned with the pivotal connection of said actuating lever to said spring engaging member.

5. The actuating mechanism of claim 2 wherein said bight portion of said housing is formed by an L-shaped member connected to each of said leg members, said L-shaped members being positioned such that the depending leg thereof is directed inwardly toward each other.

6. The actuating mechanism of claim 5 wherein the depending leg of each said L-shaped member terminates in a spaced-apart relationship to the depending leg of the other L-shaped member, such that said bight portion of said housing includes a gap through which said actuating lever may pass during a shifting of the camming surface from engagement with said bight portion to engagement with said base member.

7. The actuating mechanism of claim 6 wherein said actuating lever includes a pair of spaced-apart arms connected to said spring engaging member on opposing sides of said locking pin, said arms converging into a handle to pass through the gap in said bight portion of said housing, each said arm of said lever having a camming surface affixed thereto.

8. The actuating mechanism of claim 6 wherein each said L-shaped member is detachably connected to the respective said leg member of said housing to simplify the disassembly of said actuating mechanism.

9. The actuating mechanism of claim 6 wherein said spring engaging member includes a pair of spaced-apart washers affixed to a pin positioned therebetween and serving as the pivotal connection with said actuating lever, said washers engaging said first and second springs, respectively.

* * * * *